2,120,074

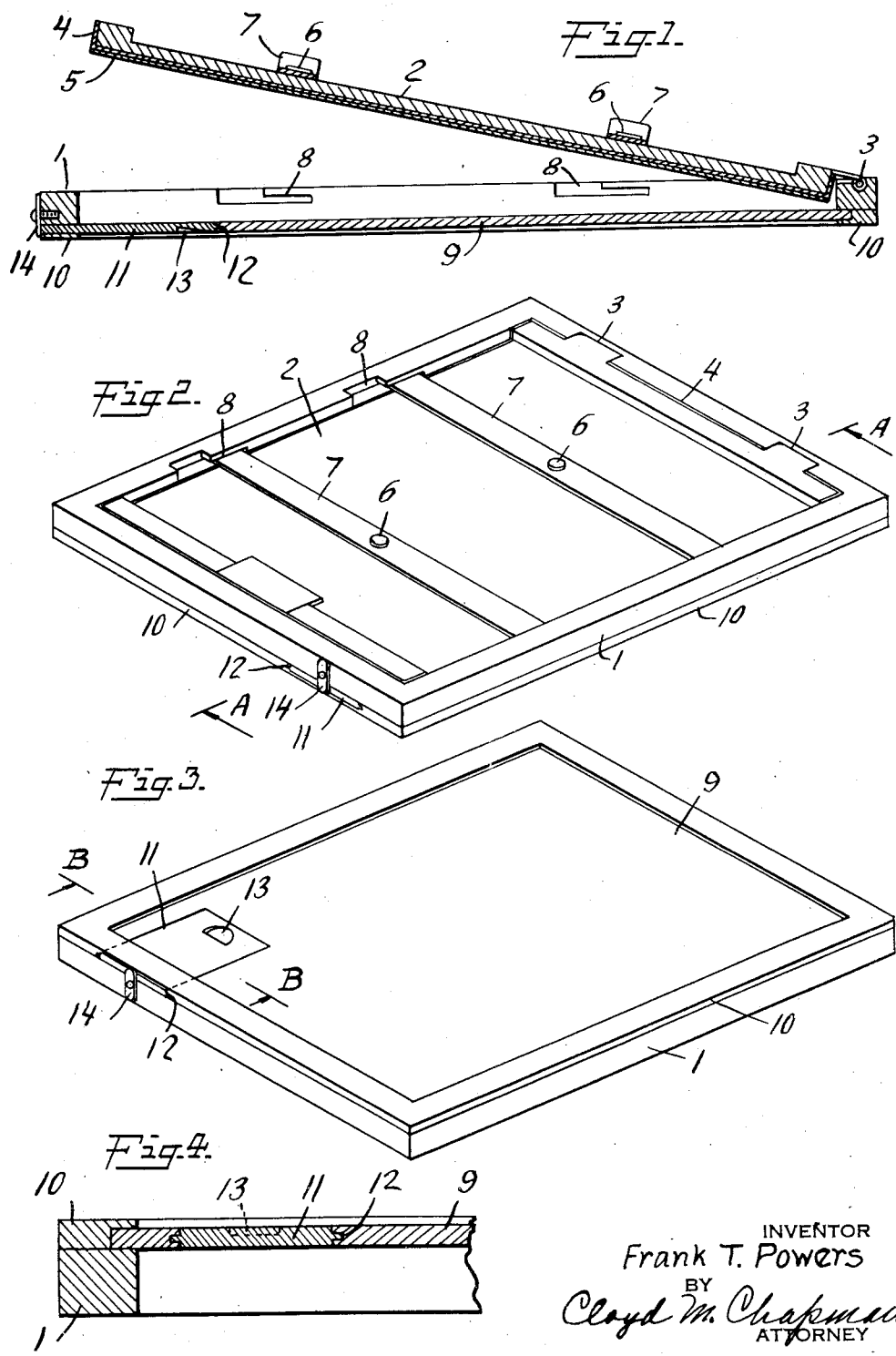
June 7, 1938. F. T. POWERS 2,120,074
METHOD FOR IDENTIFYING ROENTGENOGRAMS
Filed Jan. 29, 1937
INVENTOR
Frank T. Powers
BY
Cloyd M. Chapman
ATTORNEY Patented June 7, 1938

UNITED STATES PATENT OFFICE 2,120,074

METHOD FOR IDENTIFYING ROENTGENO-GRAMS

Frank T. Powers, Glen Cove, N. Y.

Application January 29, 1937, Serial No. 122,940

1 Claim. (Cl. 250—34)

My invention relates to the radiographic art and particularly to a method and a device for marking Roentgenograms for subsequent identification.

The object of my invention is to provide a method and an apparatus for carrying out said method, whereby fingerprints of an individual may be placed upon a Roentgenogram of some portion of the anatomy of the individual at the time of making the Roentgenogram, either immediately previous or immediately subsequent thereto, so as to provide a permanently recorded and indisputable record of the identity of the person Roentgenogramed.

By means of my invention the identity of a Roentgenogram, made and marked in accordance therewith, may be established at once beyond a reasonable doubt by a simple comparison of the finger prints on the Roentgenogram with known finger prints of the subject. Such identification is not subject to fraud or forgery or error as is the case with methods heretofore in common use.

In carrying out my new method I may use a cassette or film holder such as is shown in the accompanying drawing, in which I have shown one form of application of my invention, as illustrative but not restrictive thereof, since the invention may take on a wide variety of forms and may be applied to a variety of forms of cassettes, each of which may be best suited to adaptation with a particular form of the invention, within the limits of the appended claim.

Of the drawing—

Fig. 1 is a section through a cassette on the line AA of Fig. 2.

Fig. 2 is a perspective view of the back of the cassette.

Fig. 3 is a perspective view of the front of the cassette.

Fig. 4 is a section through a portion of the cassette on the line BB of Fig. 3.

In each of the figures like characters indicate the same or similar parts. As commonly constructed, a cassette or X-ray film holder consists of a frame 1 of metal or other suitable material, into which fits a hinged back 2, pivoted on hinges 3 and covered on the inner face and sides with a layer of felt 4, to which is attached an intensifying screen 5. Attached to the rear of the back by means of screws or rivets 6, are two spring metal clips 7, which are adapted to engage slots 8, in the frame 1. Attached to the front of frame 1 is a sheet or plate 9, of material relatively non-resistant to the passage of X-rays, such for example as aluminum or bakelite. The plate 9 may be held to the frame 1 by means of metal strips 10. In making a Roentgenogram with such a cassette, the ray sensitive medium such as celluloid, paper or glass, coated with ray sensitive emulsion, is placed, while within a dark room, in the cassette with the ray sensitive emulsion in contact with the intensifying screen 5, and the back clamped to the frame by means of the spring clips 7, in the well known manner.

With such a cassette or other types in common use, which form no part of my invention, I incorporate my improvement in a manner of which the following is an example. In the plate 9, I provide a removable portion 11, which may be moved in the light-tight dovetail 12, to uncover a portion of the X-ray sensitive medium used in making the radiogram.

To facilitate sliding the movable portion 11 an indentation 13, may be provided and to prevent the movable portion sliding out of its closed position accidentally or unintentionally a rotatable stop 14, is provided.

When a front intensifying screen is used, a portion of it, corresponding in size to the window, is cut away, giving direct access to the ray sensitive film.

In carrying out the method of my invention I proceed as follows. When about to make a Roentgenogram of a portion of the anatomy of a subject, a cassette, having a window and a light-tight cover therefor, such as is described above and shown in the drawing, or an equivalent thereof, is loaded with a ray sensitive film. Immediately before making the Roentgenogram a suitable finger printing ink or coating is applied to the skin of one or more of the digits of the subject, the window of the cassette is opened and an imprint of the digit or digits is made directly upon the surface of the ray sensitive film. The window is then closed and the Roentgenogram is made upon the film which is within the cassette after the usual manner. Or the finger printing may be done immediately after making the Roentgenogram.

The finger printing ink or coating may be of the sort usually employed for the purpose, which are commonly pigmented waxes or oils or dyes or combinations thereof. Or it may be of any other suitable material. When paper film is used it is sometimes advantageous to place the finger print on the uncoated side of the paper. After development of the image upon the film the finger print remains unaltered and serves as a positive means of identification which cannot be imitated or forged.

In this description and in the appended claims I use the term ray or Roentgen ray in referring to radiation capable of producing Roentgenograms, but I mean to include radiation other than X-rays, such for example as gamma rays or any other radiant energy which may be used for like purpose.

Having fully described my invention and the manner of carrying it out in practice so that one skilled in the art may make and use the same, I now state what I claim to be new and novel and for which I pray that Letters Patent be granted.

I claim:

The method of marking a Roentgenogram of a portion of a human subject for identification which comprises imprinting upon the surface of the ray sensitive medium used in making the Roentgenogram, a finger print of the subject being Roentgenogramed, said imprinting being accomplished by exposing a portion of the surface of said medium while said medium is within a cassette and at the time of making said Roentgenogram and impressing upon said exposed surface one or more of the digits of said subject, after first applying marking material to the skin of said digit or digits.

FRANK T. POWERS.